No. 628,045. Patented July 4, 1899.
C. T. THOMAS.
OPTICAL MEASURING INSTRUMENT.
(Application filed Dec. 6, 1898.)
(No Model.)

Witnesses
Camp T. Thomas, Inventor.
By his Attorneys.

THE NORRIS PETERS CO., PHOTO-LITHO., WASHINGTON, D. C.

UNITED STATES PATENT OFFICE.

CAMP T. THOMAS, OF FORT MADISON, IOWA.

OPTICAL MEASURING INSTRUMENT.

SPECIFICATION forming part of Letters Patent No. 628,045, dated July 4, 1899.

Application filed December 6, 1898. Serial No. 698,455. (No model.)

*To all whom it may concern:*

Be it known that I, CAMP T. THOMAS, a citizen of the United States, residing at Fort Madison, in the county of Lee and State of Iowa, have invented a new and useful Optical Measuring Instrument, of which the following is a specification.

My invention relates to an optical instrument for obtaining accurate measurements preliminary to adjusting spectacle-frames to the human face; and the primary object in view is to provide a simple and cheap construction by which the height and the extent of projection of the crest of the nose may be accurately gaged for the purpose of enabling the optician to correctly position the bridge-piece of the spectacle-frame, so that the lenses will be centered with relation to the pupils of the patient's eyes.

A further object of the invention is to provide an instrument in which the adjustable gage or gages are frictionally confined in the positions to which they may be moved, to the end that the operator may readily read the scales provided on the instrument.

A further object is to provide an instrument with means for readily ascertaining the pupillary distance between the eyes.

With these ends in view the invention consists in the novel combination of elements and in the construction and arrangement of parts, which will be hereinafter fully described and claimed.

To enable others to understand the invention, I have illustrated a preferred embodiment thereof in the accompanying drawings, forming a part of this specification, and in which—

Figure 1:
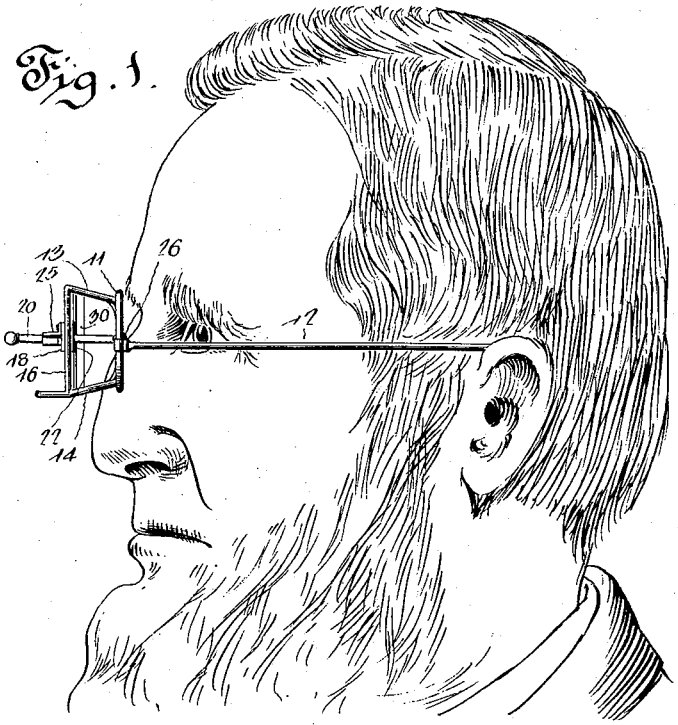
Figure 3:
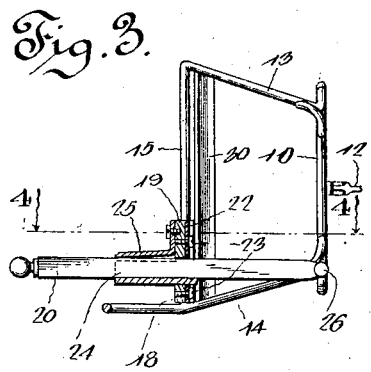
Figure 4:
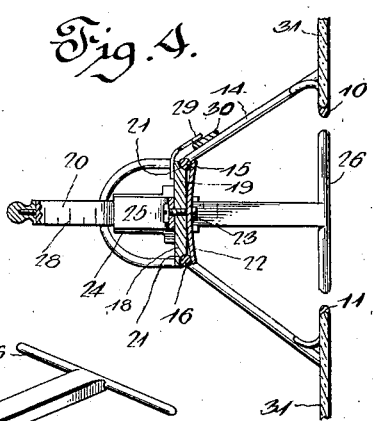
Figure 5:
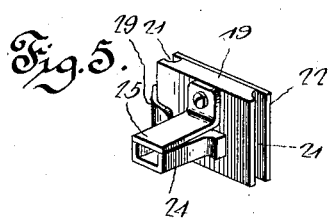
Figure 6:
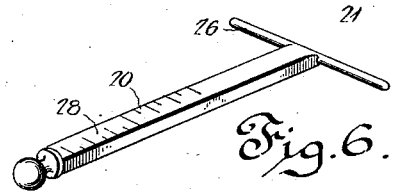
Figure 2:
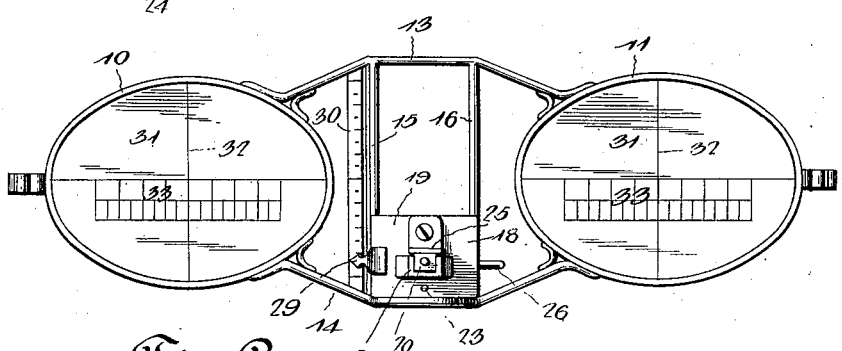

Figure 1 is a side view of a human head with my optical measuring instrument fitted thereto. Fig. 2 is a front elevation of the instrument. Fig. 3 is a vertical longitudinal sectional view on a plane through the gage of the instrument. Fig. 4 is a longitudinal sectional view on the plane indicated by the line 4 4 of Fig. 3. Fig. 5 is a detail perspective view of the vertically-movable friction-slide forming one member of the gage. Fig. 6 is a like view of the slidable bar which constitutes the other member of the crest-finding gage.

Like numerals of reference denote like and corresponding parts in each of the several figures of the drawings.

In carrying my invention into practice the instrument is provided with lens-frames 10 and 11, and bows 12 are connected with these lens-frames in an ordinary way similar to spectacles. The lens-frames are arranged or spaced a proper distance apart corresponding to what may be assumed as a standard measurement, and said frames are jointed firmly or rigidly together by a carrying-frame for supporting the gage of the instrument. This carrying-frame is extended or projected a proper distance beyond a plane which intersects the lenses or the lens-frames for supporting the gage in a manner to permit the operator to adjust the members of the gage and to secure horizontal adjustment of one gage member for a distance sufficient for the measurement of the different styles or shapes of noses. This carrying-frame consists of an upper member 13, a lower member 14, and vertical guide-bars 15 16, which join the two frame members 13 14. The upper and lower frame members lie in substantially horizontal positions, and they are joined firmly to the upper and lower edges, respectively, of the lens-frames in any approved manner. These members of the supporting-frame are thus disposed in horizontal planes above and below a line which extends in the direction of the major axes of the lenses, and said frame members 13 14 are bowed or bent to project outwardly from the lens-frames at a proper distance. The vertical bars 15 16, forming a part of the carrying-frame, are arranged parallel to each other, and they are united to the upper and lower frame members at the outer portion thereof. These vertical bars thus lie in a vertical plane in advance of the lens-frames, and they constitute a guideway between the members of the frame for supporting the vertically-slidable member of the gage. This gage is designated in its entirety by the numeral 18, and it consists, preferably, of a friction-plate 19 and a bar 20. The friction-plate 19 constitutes one member of the gage and the bar 20 the other member thereof, and the gage member 19 is fitted slidably to the guideway formed by the vertical bars, so that it may be adjusted vertically on the carrying-frame, while the other gage member 20 is supported slidably within the gage member 19 for the purpose of traveling vertically therewith and of sliding horizontally on said gage member 19 independently of its vertical adjustment. The friction plate or slide 19 has its edges provided with grooves 21, that are adapted to receive the guide-bars 15 16, and to this friction-plate 19 is fitted a spring-plate 22, which is confined on the friction-plate by screws 23 and which spring-plate has its edges arranged to slidably embrace the guide-bars 15 16, so as to hold the friction-plate 19 firmly in place on the guide-bars by frictional contact therewith. This friction plate or slide 19 is provided with a central guide box or loop 24, which occupies a horizontal position and extends from the front face of the plate or slide 19, and in this guide box or loop is slidably fitted the horizontal bar 20, the cross-sectional contour of which conforms accurately to that of the guide-box. This guide-box is open at its upper side for the reception of a friction-spring 25, which is fastened firmly to the front face of the slide or plate 19, and this friction-spring is adapted to bind on the slidable bar 20 to hold the latter in its adjusted position on the vertically-movable slide or plate 19. It will thus be seen that the gage bar or member 20 will travel with the friction slide or plate 19 in its vertical adjustment; but the gage-bar 20 is capable of a horizontal adjustment in the gage plate or slide 19 independently of the vertical adjustment of the latter. This horizontally-slidable gage bar or member 20 is provided on its upper face with a graduated scale 28, and the indications on this scale may readily be read off by the operator, the outer extremity of the spring 25 serving as the indicator or pointer in determining the adjustment of the gage member 20 for ascertaining the extent of projection of the crest of the nose with relation to a plane through the lens-frames.

The gage member or bar 20 is provided at its inner end with a cross-head 26, which is in a plane parallel to the lens-frames, and the outer end of said member or bar 20 has an operating-knob 27, by which the bar may be conveniently grasped for the purpose of adjusting the same within the gage member or plate 19.

The plate or slide 19 carries a pointer or finger 29, which projects beyond one edge of said slide and one of the guide-bars 15 or 16, and this pointer is adapted to traverse the scale on a graduated bar 30, which is firmly fixed to the frame members in a position parallel to one of the guide-bars 15 or 16.

Mounted in the frames 10 11 are ordinary plain lenses 31, each of which has a vertical score-line 32 in the plane of its minor axis, and this score-line is intersected by a graduated scale 33, which is in the plane of the major axis of the lens.

In using my measuring instrument the lens-frames and bows are fitted to the face and head in the same way as an ordinary pair of spectacles. By observing the positions of the pupils of the eyes with relation to the scales 33 on the lenses the distance between the pupils may be readily ascertained. To find the crest of the nose, the gage plate or member 19 is raised or lowered with relation to the plane of the scales 33 on the lenses, and the gage member 20 is moved horizontally through its guideway in the gage member 19. The head of the member 20 may rest upon the crest or bridge of the nose, and the two members 19 20 are held by their friction devices in position for the operator to readily read off the indications on the scales 28 30. The gage member 19 indicates the elevation or height of the crest of the nose with relation to the scales 33 on the lenses, while the gage member 20 indicates the extent or degree of projection of the highest point or crest of the nose relatively to the plane which intersects the two lenses.

My instrument enables an optician to easily and accurately determine the pupillary distance of the eyes and the height and projection of the crest of the nose, whereby the optician may accurately adjust the lenses in a pair of spectacle-frames and determine the position of the bridge-piece with a view to fitting the spectacle-frames to the wearer's face in a manner to bring the center of the lenses in the plane of the pupils of the eyes. The instrument is simple in construction and easily adjusted to secure the accurate measurements.

Changes may be made in the form and proportion of some of the parts, while their essential features are retained and the spirit of the invention embodied. Hence I do not desire to be limited to the precise form of all the parts as shown, reserving the right to vary therefrom.

Having thus fully described my invention, what I claim is—

1. In an optical measuring instrument, the combination with lens-frames, of a supporting-frame attached thereto and provided with guide-bars, a friction-slide engaging with said bars and provided with a spring, and a gage member carried by the friction-slide, substantially as described.

2. In an optical measuring instrument, the combination with lens-frames, and a carrying-frame, of a vertically-movable friction-slide fitted to the carrying-frame, a guide fast with said slide, a horizontally-slidable gage-bar fitted in the said slide and the guide thereof and provided at its inner end with a head, and a friction-spring attached to the slide and binding on said gage-bar, substantially as described.

3. In an optical measuring instrument, the combination with a frame, of vertical guide-bars fixed to said frame, a vertically-movable slide fitted to said guide-bars, an elastic plate fastened to the slide and engaging frictionally with the guide-bars, and a gage-bar slidably fitted in the slide, whereby the gage-bar may be adjusted vertically with the slide, and is adapted for horizontal adjustment independently of said slide, substantially as described.

4. An optical measuring instrument comprising the lens and supporting frames, vertical guide-bars fixed to the supporting-frame between the lens-frames, a vertical graduated bar parallel to one of the guide-bars, a vertically-adjustable slide fitted to the guide-bars and carrying a pointer arranged to traverse the graduated bar, a graduated gage-bar slidably fitted in the slide, and friction-springs attached to the slide, one of said springs engaging a guide-bar, and the other engaging the gage-bar, substantially as described.

In testimony that I claim the foregoing as my own I have hereto affixed my signature in the presence of two witnesses.

CAMP T. THOMAS.

Witnesses:
A. P. BROWN,
ROBERT BUCHHOLZ.